US007183520B2

(12) United States Patent
Park

(10) Patent No.: US 7,183,520 B2
(45) Date of Patent: Feb. 27, 2007

(54) OVEN

(75) Inventor: Guen Yong Park, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/311,664

(22) Filed: Dec. 20, 2005

(65) Prior Publication Data

US 2006/0289435 A1 Dec. 28, 2006

(30) Foreign Application Priority Data

Jun. 10, 2005 (KR) ...................... 10-2005-0049744

(51) Int. Cl.
*F24C 15/16* (2006.01)
*A21B 3/00* (2006.01)

(52) U.S. Cl. ....................................... 219/394; 126/333

(58) Field of Classification Search ..................... None
See application file for complete search history.

(56) References Cited

U.S. PATENT DOCUMENTS

| | | | | |
|---|---|---|---|---|
| 2,994,760 A * | 8/1961 | Pecoraro et al. | ............ | 219/394 |
| 4,780,597 A * | 10/1988 | Linhart et al. | .............. | 219/404 |
| 5,618,458 A * | 4/1997 | Thomas | ...................... | 219/394 |
| 6,545,251 B2 * | 4/2003 | Allera et al. | ................ | 219/394 |
| 7,071,448 B1 * | 7/2006 | Kim et al. | .................. | 219/394 |

FOREIGN PATENT DOCUMENTS

| | | | |
|---|---|---|---|
| GB | 2321962 A | * | 12/1998 |
| JP | 2002-008846 | | 1/2002 |
| KR | 20-0209671 | | 1/2001 |

* cited by examiner

*Primary Examiner*—Joseph Pelham
(74) *Attorney, Agent, or Firm*—Staas & Halsey LLP

(57) ABSTRACT

An oven that is capable of minimizing heat transfer between adjacent cooking spaces along the wall of a cooking chamber. The oven includes an oven body having a cooking chamber, a partition to partition the cooking chamber into a plurality of cooking spaces, and insulating grooves formed at a wall of the cooking chamber to minimize heat transfer between the cooking spaces.

12 Claims, 5 Drawing Sheets

OVEN

CROSS-REFERENCE TO RELATED APPLICATIONS

This application claims the benefit of Korean Patent Application No. 2005-49744, filed on Jun. 10, 2005 in the Korean Intellectual Property Office, the disclosure of which is incorporated herein by reference.

BACKGROUND OF THE INVENTION

1. Field of the Invention

The present invention relates to an oven to cook food. More particularly, to an oven having a plurality of cooking spaces partitioned in a cooking chamber.

2. Description of the Related Art

Examples of an oven having a plurality of cooking spaces are disclosed in Japanese Unexamined Patent Publication No. 2002-8846 and Korean Registered Utility Model Publication No. 20-209671.

The conventional oven disclosed in Japanese Unexamined Patent Publication No. 2002-8846 includes a cooking chamber partitioned into first and second cooking chambers by a partition. Microwaves generated from a magnetron are separately supplied into the first and second cooking spaces such that food is cooked individually in the respective cooking spaces. The oven disclosed in Korean Registered Utility Model Publication No. 20-209671 includes a cooking chamber partitioned into a plurality of cooking spaces by a partition and a shelf. The cooking spaces are heated by electric heaters, which are independently controlled, and heat transfer between the adjacent cooking spaces is prevented by the partition.

In each of the ovens, food is cooked individually in the respective partitioned cooking spaces, and different kinds of food are cooked in the respective cooking spaces under different heating conditions.

When different kinds of food are cooked in the respective cooking spaces under different heating conditions, however, heat is transferred from one of the cooking spaces to another cooking space along the wall of the cooking chamber. As a result, it is difficult to maintain the respective cooking spaces at desired temperatures, and heat loss is generated. Specifically, the interior temperature of the cooking space having relatively low temperature is increased by heat transferred from the cooking space having relatively high temperature along the wall of the cooking chamber. Also, the heat is transferred from the cooking space having relatively high temperature to the cooking space having relatively low temperature, and therefore, heat loss is generated.

SUMMARY OF THE INVENTION

Accordingly, it is an aspect of the invention to provide an oven that is capable of minimizing heat transfer between adjacent cooking spaces along the wall of a cooking chamber.

Additional aspects and/or advantages of the invention will be set forth in part in the description which follows and, in part, will be apparent from the description, or may be learned by practice of the invention.

The foregoing and/or other aspects of the present invention are achieved by providing an oven including an oven body having a cooking chamber, a partition to partition the cooking chamber into a plurality of cooking spaces, and insulating grooves formed at a wall of the cooking chamber to minimize heat transfer between the cooking spaces.

The oven further includes mounting parts provided at the wall of the cooking chamber such that the partition is mounted on the mounting parts, wherein the insulating grooves are disposed adjacent to the mounting parts.

The oven further includes opening/closing devices to open or close the insulating grooves, wherein the opening/closing devices are separated from the respective insulating grooves when the partition is mounted, and close the respective insulating grooves when the partition is removed.

Each of the opening/closing devices includes an opening/closing member hingedly mounted at an outside of the wall of the cooking chamber to open and close the corresponding insulating groove, a spring to support the opening/closing member such that the opening/closing member is rotated in a direction of closing the corresponding insulating groove, and a push protrusion extending from the opening/closing member toward the corresponding mounting part such that the opening/closing member is separated from the corresponding insulating groove when the partition is mounted.

The insulating grooves are arranged around the partition in groups.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
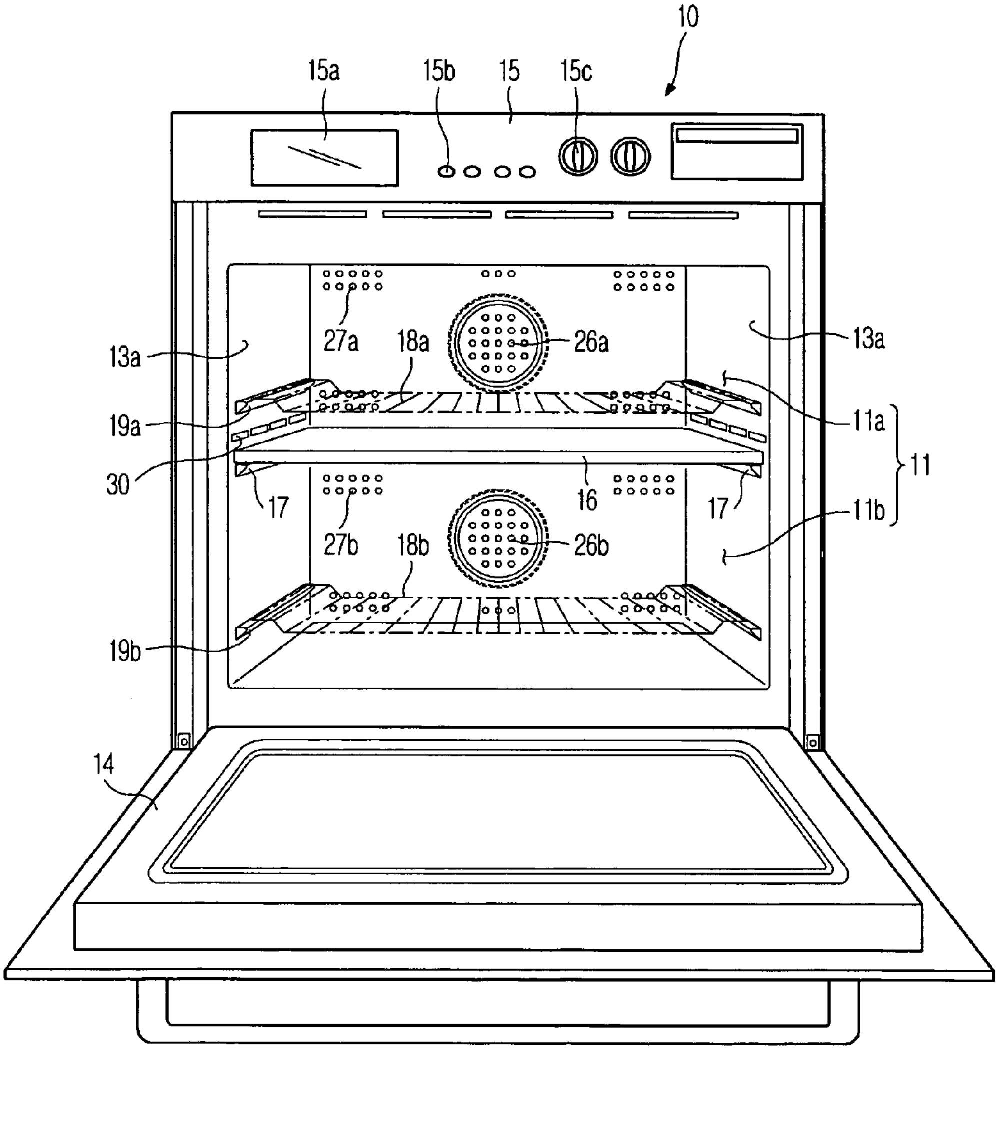
FIG. 1 is a perspective view illustrating an oven according to an embodiment of the present invention.

Reference will now be made in detail to the embodiment of the present invention, examples of which are illustrated in the accompanying drawings, wherein like reference numerals refer to like elements throughout. The embodiment is described below to explain the present invention by referring to the figures.

Figure 2:
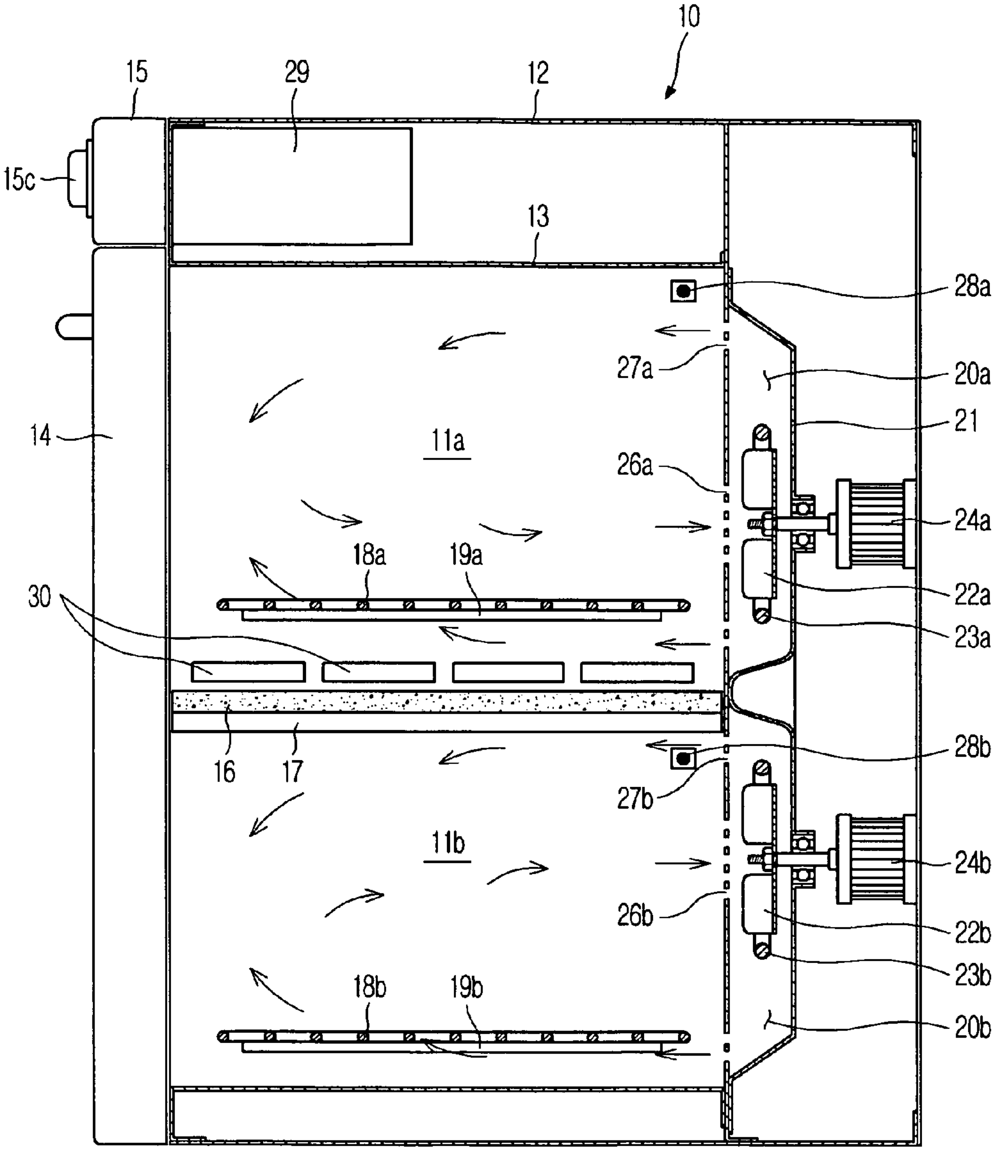
FIG. 2 is a sectional view illustrating the oven according to the present invention as shown in FIG. 1.

In FIGS. 1 and 2, there is shown an oven according to an embodiment of the present invention. The oven comprises an oven body 10 having an outer case 12, which is made of steel, and an inner case 13 mounted inside the outer case 12 while being spaced apart from the outer case 12. The inner case 13 comprises a cooking chamber 11 defined therein.

The cooking chamber 10 comprises an open front surface, through which food is introduced into or removed from the cooking chamber 10. To the front surface of the oven body 10 is vertically hingedly connected a door 14, by which the cooking chamber 11 is opened or closed. At the front surface of the oven body 10 above the door 14 is disposed a manipulation panel 15 comprising a display unit 15*a* to display operation of the oven, various manipulation buttons 15*b*, and various manipulation switches 15*c*.

The cooking chamber 11 is partitioned into a first cooking chamber 11*a* and a second cooking chamber 11*b* by a partition 16. Specifically, the cooking chamber 11 is partitioned into the first and second cooking chambers 11*a* and 11*b* when the partition 16 is mounted in the cooking chamber 11, and the first and second cooking chambers 11*a* and 11*b* communicate with each other when the partition 16 is removed from the cooking chamber 11. To this end, mounting parts 17 are provided at opposite side walls of the cooking chamber 11 (the inner walls of the inner case). The mounting parts 17 extend from the front to the rear of the cooking chamber 11.

In addition, food shelves 18*a* and 18*b* are mounted in the first and second cooking chambers 11*a* and 11*b*, respectively, such that food is placed on the food shelves 18*a* and 18*b*. At the opposite side walls of the first and second cooking chambers 11*a* and 11*b* are provided shelf supporting members 19*a* and 19*b* to support the food shelves 18*a* and 18*b*.

At the outside of the inner case 13 at the rear of the cooking chamber 11 is mounted a heater case 21, by which a first upper heater compartment 20*a* and a second lower heater compartment 20*b* are defined while the first upper heater compartment 20*a* and the second lower heater compartment 20*b* are divided from each other, as shown in FIG. 2. In the first heater compartment 20*a* are mounted a first circulating fan 22*a* to circulate air inside the first cooking chamber 11*a* and a first heater 23*a*, which is disposed at the outer circumference of the first circulating fan 22*a*. In the second heater compartment 20*b* are mounted a second circulating fan 22*b* to circulate air inside the second cooking chamber 1*b* and a second heater 23*b*, which is disposed at the outer circumference of the second circulating fan 22*b*. At the outside of the heater case 21*b* are mounted a first motor 24*a* to drive the first circulating fan 22*a* and a second motor 24*b* to drive the second circulating fan 22*b*. However, the present invention is not limited to any particular number of heaters, and may vary as necessary.

At the rear walls of the first and second cooking chambers 11*a* and 11*b* (the rear wall of the inner case) are formed suction holes 26*a* and 26*b* and discharge holes 27*a* and 27*b*, through which the first and second cooking chambers 11*a* and 11*b* communicate with the first and second heater compartments 20*a* and 20*b*, respectively, to circulate air. Consequently, air flows from the first and second cooking chambers 20*a* and 20*b* to the first and the second heater compartments 20*a* and 20*b* by the first and second circulating fans 22*a* and 22*b*, respectively, and is heated by the first and second heaters 23*a* and 23*b*. Then, the heated air flows from first and the second heater compartments 20*a* and 20*b* to the first and second cooking chambers 20*a* and 20*b* by the first and second circulating fans 22*a* and 22*b*, respectively.

The first circulating fan 22*a* and the first heater 23*a* or the second circulating fan 22*b* and the second heater 23*b* are operated, or the first and second circulating fans 22*a* and 22*b* and the first and second heaters 23*a* and 23*b* are simultaneously operated by user manipulation of the manipulation panel 15, such that food is cooked in either the first cooking chamber 11*a* and the second cooking chamber 11*b* or simultaneously in both the first and second cooking chambers 11*a* and 11*b*. When it is necessary to cook food simultaneously in both the first and second cooking chambers 11*a* and 11*b* under different temperature conditions, power sources applied to the first and second heaters 23*a* and 23*b* are separately controlled such that the interior temperature of the first cooking chamber 11*a* is different from that of the second cooking chamber 11*b*. Therefore, the oven further comprises sensors 28*a* and 28*b* to sense an interior temperature of the first and second cooking chambers 11*a* and 11*b*, and a control unit 29 to control the power sources applied to the first and second heaters 23*a* and 23*b* based on sensed information of the sensors 28*a* and 28*b*, as shown in FIG. 2.

To minimize heat transfer between one of the cooking chambers to the other cooking chamber, the partition 16 is made of an insulating member, and an insulating unit is mounted at the side walls of the inner case 13 between the first cooking chamber 11*a* and the second cooking chamber 11*b* (the side walls of the inner case). As a result, heat transfer along the partition 16 and the side walls 13*a* of the inner case 13 between the first and second cooking chambers 1*a* and 11*b* is minimized. Consequently, difference in temperature between the first and second cooking chambers 11*a* and 11*b* is maintained, and therefore, heat loss due to heat transfer between the first and second cooking chambers 11*a* and 11*b* is greatly reduced.

Figure 3:
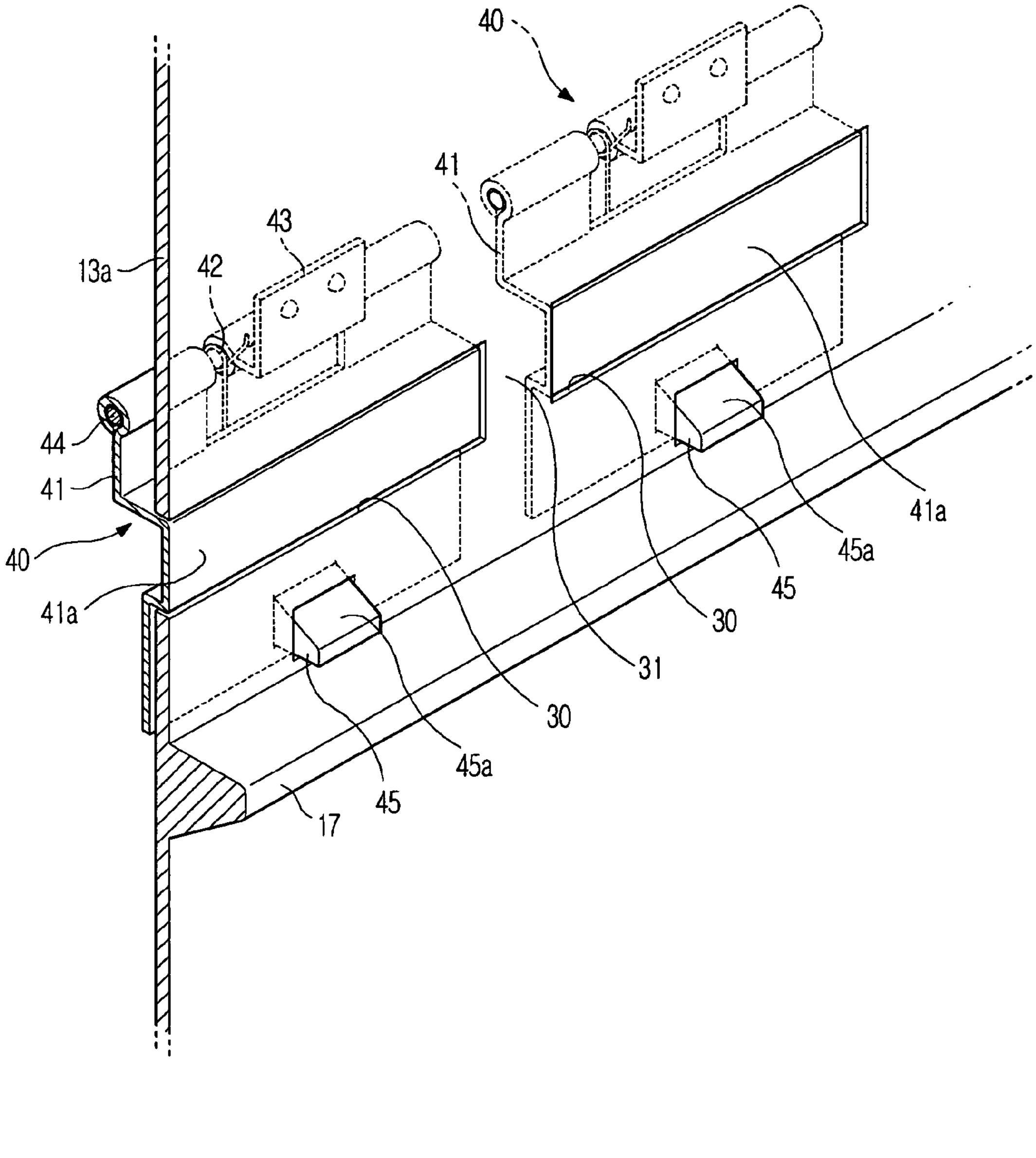
FIG. 3 is a perspective view illustrating the insulating grooves and opening/closing devices of the oven shown in FIGS. 1 and 2, according to an embodiment of the present invention.
Figure 4:
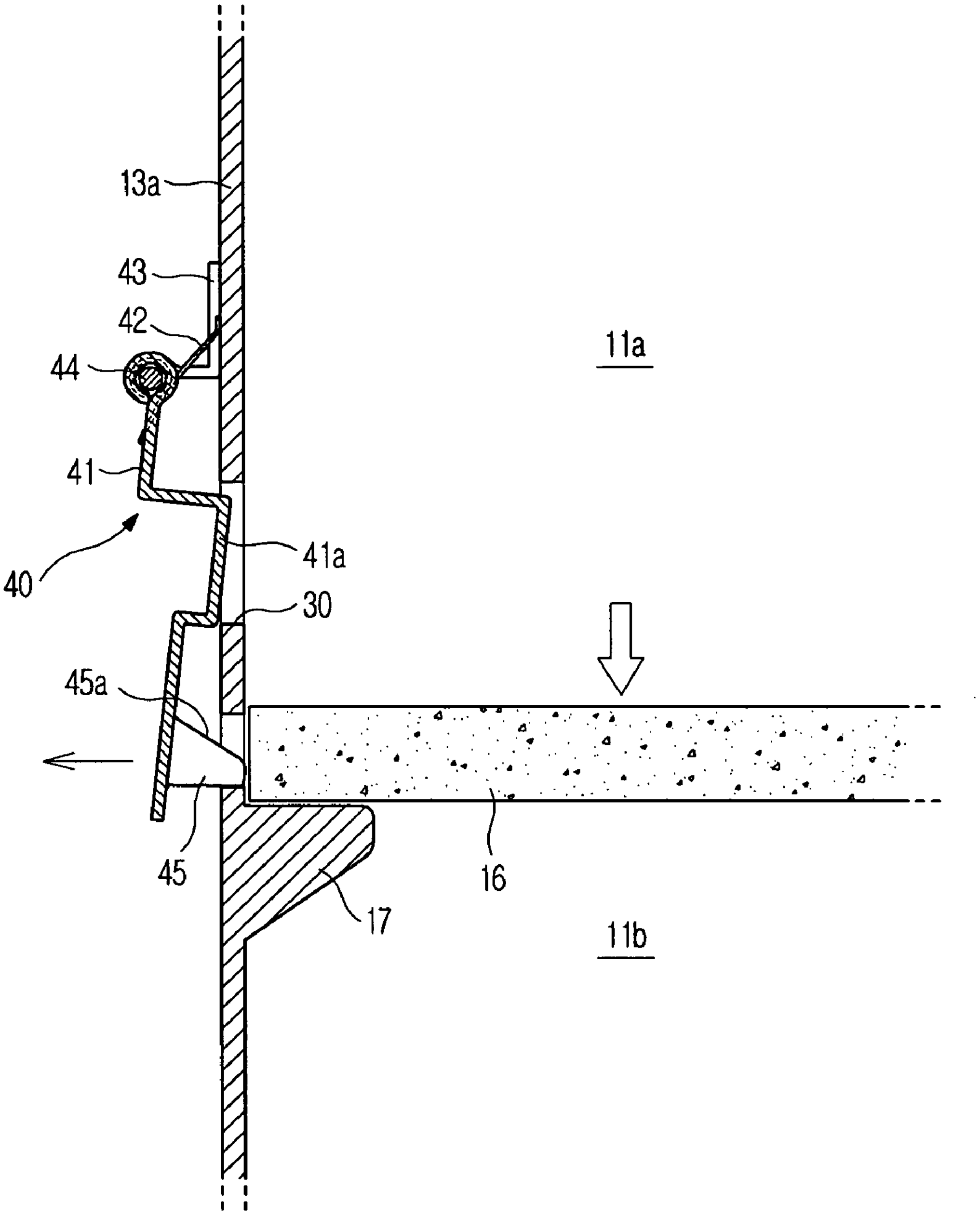
FIG. 4 is a sectional view illustrating the insulating groove and the opening/closing device of the oven according to an embodiment of the present invention when a partition is mounted.

In FIGS. 3 and 4, the insulating unit comprises insulating grooves 30 formed at the opposite side walls of the inner case 13 between the first and second cooking chambers 11*a* and 11*b*, and opening/closing devices 40 to open the insulating grooves 30 when the partition 16 is mounted and to close the insulating grooves 30 when the partition 16 is removed.

The insulating grooves 30 separate the opposite side walls 13*a* of the inner case 13 between the first and second cooking chambers 11*a* and 11*b* from each other to minimize heat transfer between the first and second cooking chambers 11*a* and 11*b* along the opposite side walls 13*a*. Specifically, the insulating grooves 30 are formed at the opposite side walls 13*a* of the inner case 12 at the position adjacent to the mounting parts 17, on which the partition 16 is mounted, while extending in the longitudinal direction of the mounting parts 17 to separate the first cooking chamber side and the second cooking chamber side from each other.

As described above, connection parts 31 having a predetermined width are disposed between the respective adjacent insulating grooves 30, when the insulating grooves 30 are formed, such that the side walls 13*a* of the first cooking chamber 11*a* are connected to the side walls 13*a* of the second cooking chamber 11*b*. As a result, rigidity of the inner case 13 is maintained. At this time, heat may be transferred between the first and second coking chambers 11*a* and 11*b* along the connection parts 31. However, the predetermined width of the connection parts 31 is very small as compared to the length of the insulating grooves 30, and therefore, the heat transfer between the first and second cooking chambers 11*a* and 11*b* along the connection parts 31 is neglected.

Each of the opening/closing devices 40 to open or close the insulating grooves 30 comprises an opening/closing member 41 hingedly mounted at the outside of the corresponding side wall 13*a* of the inner case 13, a spring 42 to pressurize the opening/closing member 41 such that the opening/closing member 41 opens or closes the corresponding insulating groove 30, and a push protrusion 45 configured to be separated from the corresponding insulating groove 30 as the opening/closing member 41 is pushed by the partition 16 when the partition 16 is mounted.

The opening/closing member 41 is connected with a fixing member 43, the upper end of which is fixed with the inner case 13, via a connection pin 44. The opening/closing member 41 comprises an opening/closing part 41*a*, which is formed such that the opening/closing part 41*a* can be inserted into the corresponding insulating groove 30. Consequently, the opening/closing member 41 can be rotated about the connection pin 44. Through the rotation of the opening/closing member 41, the opening/closing part 41*a* is inserted into the corresponding insulating groove 30 to close the corresponding insulating groove 30 or is separated from the corresponding insulating groove 30 to open the corresponding insulating groove 30.

The spring 42 is a torsion spring, which is mounted at the connection pin 44. However, the present invention is not limited thereto, any suitable spring may be applied. The spring 42 pressurizes the opening/closing member 41 such that the opening/closing member 41 is rotated in the direction of closing the corresponding insulating groove 30. Consequently, the opening/closing member 41 closes the corresponding insulating grooves 30 while the partition 16 is not mounted.

Figure 5:
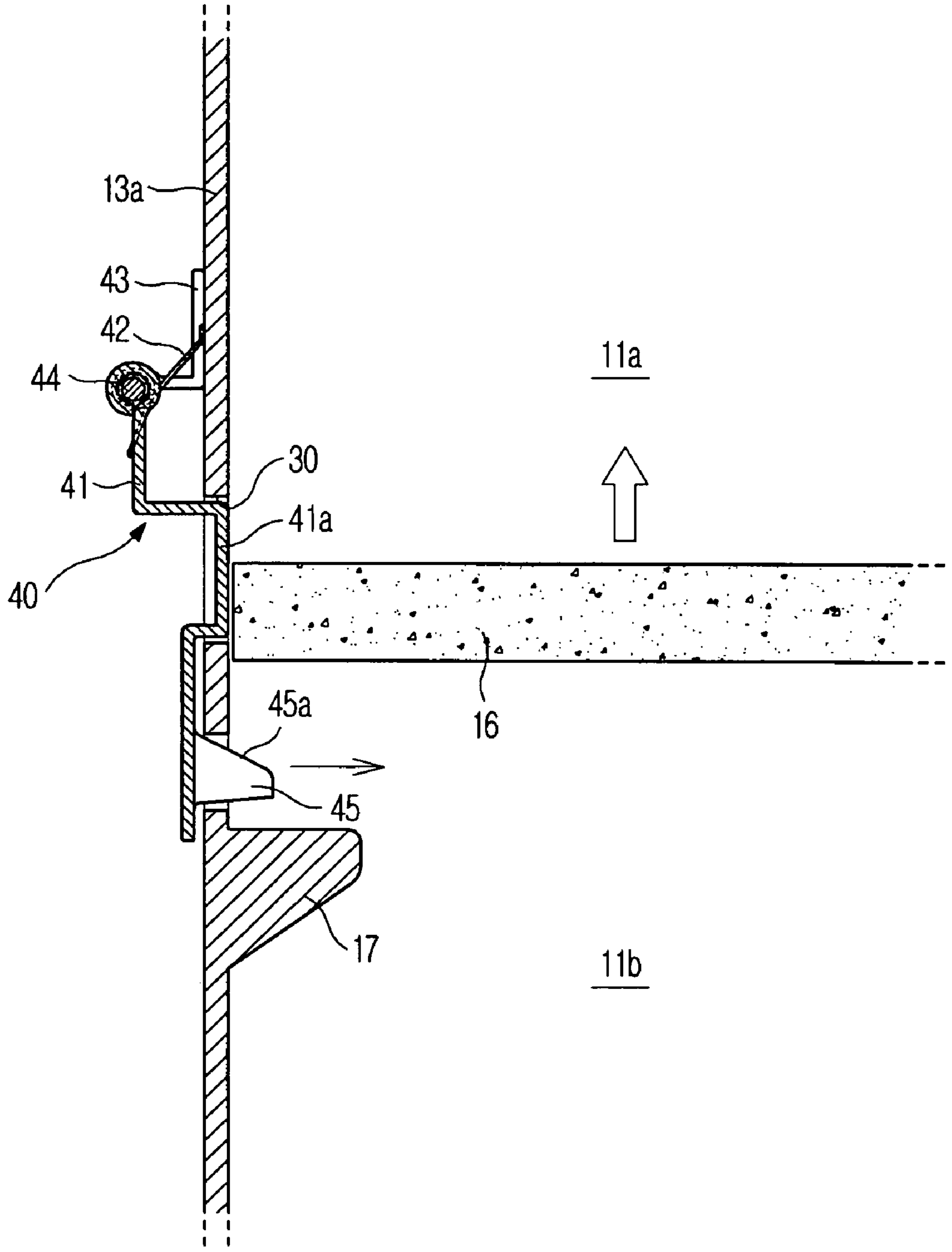
FIG. 5 is a sectional view illustrating the insulating groove and the opening/closing device of the oven according to an embodiment of the present invention when the partition is removed.

In FIGS. 4 and 5, the push protrusion 45 extends from the opening/closing member 41 toward the mounting part 17, at which the partition 16 is mounted, through the corresponding side wall 13*a* of the inner case 13. Also, the push protrusion 45 comprises an inclined upper surface 45*a* such that the push protrusion 45 can be easily pushed outward from the cooking chamber 11 by the partition 16 when the partition 16 is mounted.

When the partition 16 is mounted, as shown in FIG. 4, the push protrusion 45 is pushed by the end of the partition 16, and therefore, the opening/closing part 41*a* of the opening/closing member 41 is separated from the corresponding insulating groove 30. Consequently, heat transfer along the corresponding side wall 13*a* of the inner case 13 is minimized.

While the partition 16 is mounted, air may leak from the first cooking chamber 11*a* through a gap between the opening/closing part 41*a* and the corresponding insulating groove 30. In FIG. 4, however, a degree of separation of the opening/closing part 41*a* of the opening/closing member 41 from the corresponding insulating groove 30 is small, and therefore, air flow through the gap between the opening/closing part 41*a* and the corresponding insulating groove 30 is restricted. As a result, a leakage amount of air is small, and heat loss of the first cooking chamber 11*a* due to the leakage of air is neglected. The upper and lower side walls 13*a* of the inner case 13 are separated from each other by the insulating grooves 30, and therefore, heat transfer at the area where the insulating grooves 30 are formed is prevented.

When the partition 16 is removed, as shown in FIG. 5, the opening/closing member 41 is rotated toward the corresponding insulating groove 30 by elasticity of the spring 42 to close the corresponding insulating groove 30. Consequently, the leakage of air through the insulating groove 30 is prevented. At this time, the opening/closing member 41 is brought into contact with the corresponding insulating groove 30, and therefore, heat is transferred between the upper and lower side walls 13*a* of the inner case 13. In this case, however, the cooking chamber 11 is used as a single cooking space, and therefore, such heat transfer is good to uniformly distribute temperature throughout the cooking chamber 11.

In the illustrated embodiment, the insulating grooves and the opening/closing devices are provided at the opposite side walls of the cooking chamber. As an alternative, additional insulating grooves and opening/closing devices may be provided at the rear wall of the cooking chamber in the same fashion such that heat transfer between the first and second cooking chambers is further prevented.

In the illustrated embodiment, the insulating grooves and the opening/closing devices are applied to the oven having the vertically partitioned cooking chambers. As an alternative, the insulating grooves and the opening/closing devices may be applied to an oven having horizontally partitioned cooking chambers.

As apparent from the above description, heat transfer between the first and second cooking chambers is prevented by the insulating grooves formed at the walls between the first and second cooking chambers. Consequently, heat transfer from one of the cooking chambers to the adjacent cooking chamber along the walls of the cooking chambers is minimized.

Furthermore, the opening/closing members are separated from the corresponding insulating grooves when the partition is mounted, and therefore, heat transfer along the walls is minimized. Also, the insulating grooves are closed by the corresponding opening/closing members when the partition is removed, and therefore, the leakage of air through the insulating grooves is prevented.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An oven comprising:
- an oven body having a cooking chamber;
- a partition to partition the cooking chamber into a plurality of cooking spaces; and
- insulating grooves formed at a wall of the cooking chamber to minimize heat transfer between the cooking spaces; and
- opening/closing devices to open the insulating grooves when the partition is mounted in the cooking chamber and to close the insulating grooves when the partition is removed from the cooking chamber.

2. The oven according to claim 1, further comprising mounting parts provided at the wall of the cooking chamber such that the partition is mounted on the mounting parts, wherein the insulating grooves are disposed adjacent to the mounting parts.

3. The oven according to claim 2, wherein the opening/closing devices are separated from the respective insulating grooves when the partition is mounted, and close the respective insulating grooves when the partition is removed.

4. The oven according to claim 3, wherein each of the opening/closing devices comprises:
- an opening/closing member hingedly mounted at the outside of the wall of the cooking chamber to open and close the corresponding insulating groove;
- a spring to support the opening/closing member such that the opening/closing member is rotated in a direction of closing the corresponding insulating groove; and
- a push protrusion extending from the opening/closing member toward the corresponding mounting part such that the opening/closing member is separated from the corresponding insulating groove when the partition is mounted.

5. The oven according to claim 2, wherein the insulating grooves are arranged around the partition in groups.

6. The oven according to claim 1, further comprising:
- a plurality heaters to respectively heat each of the cooking spaces;

a plurality of sensors, each sensor positioned in a respective cooking space to sense an interior temperature of the respective cooking space; and a control unit, to control power sources applied to the heaters based on sensed information of the sensors.

7. The oven according to claim 2, wherein the insulating grooves are formed at opposite sidewalls of the cooking chamber adjacent to the mounting parts, on which the partition is mounted, while extending in a longitudinal direction of the mounting parts, to separate the cooking spaces from each other.

8. The oven according to claim 4, further comprising: a fixing member fixed to an inner case of the oven, wherein the opening/closing member is connected to the fixing member via a connection pin.

9. The oven according to claim 8, wherein each opening/closing member comprises:

an opening/closing part to be inserted into a corresponding insulating groove, wherein rotation of the opening/closing member about the connection pin allows the opening/closing part to be inserted into a corresponding insulating groove to close the corresponding insulating groove, and the opening/closing part is separated from the corresponding insulating groove to open the corresponding insulating groove.

10. The oven according to claim 9, wherein the push protrusion comprises an inclined upper surface to push the push protrusion outward from the cooking chamber by the partition when the partition is mounted, thereby separating the opening/closing part from the corresponding insulating groove.

11. The oven according to claim 10, wherein when removing the partition, the opening/closing part is rotated toward the corresponding insulating groove by the spring to close the corresponding insulating groove.

12. An oven comprising:

an oven body having a cooking chamber;

a partition to partition the cooking chamber into a plurality of cooking spaces; and an insulating unit to separate a wall between the cooking spaces from each other, to minimize heat transfer between the cooking spaces, when the partition is mounted, wherein the insulating unit comprises:

insulating grooves formed at opposite sidewalls of an inner case of the cooking chamber, between the cooking spaces, and opening/closing devices to open the insulating grooves when the partition is mounted in the cooking chamber and to close the insulating grooves when the partition is removed from the cooking chamber.

* * * * *

UNITED STATES PATENT AND TRADEMARK OFFICE

CERTIFICATE OF CORRECTION

PATENT NO. : 7,183,520 B2
APPLICATION NO. : 11/311664
DATED : February 27, 2007
INVENTOR(S) : Guen Yong Park It is certified that error appears in the above-identified patent and that said Letters Patent is hereby corrected as shown below:

Column 6, Line 33, after “spaces;” delete “and”.

Signed and Sealed this

Twenty-sixth Day of June, 2007

JON W. DUDAS

*Director of the United States Patent and Trademark Office*